July 28, 1953  G. P. LEISTENSNIDER  2,646,595
METHOD FOR MOLDING O-RING GASKETS
Filed Jan. 28, 1949
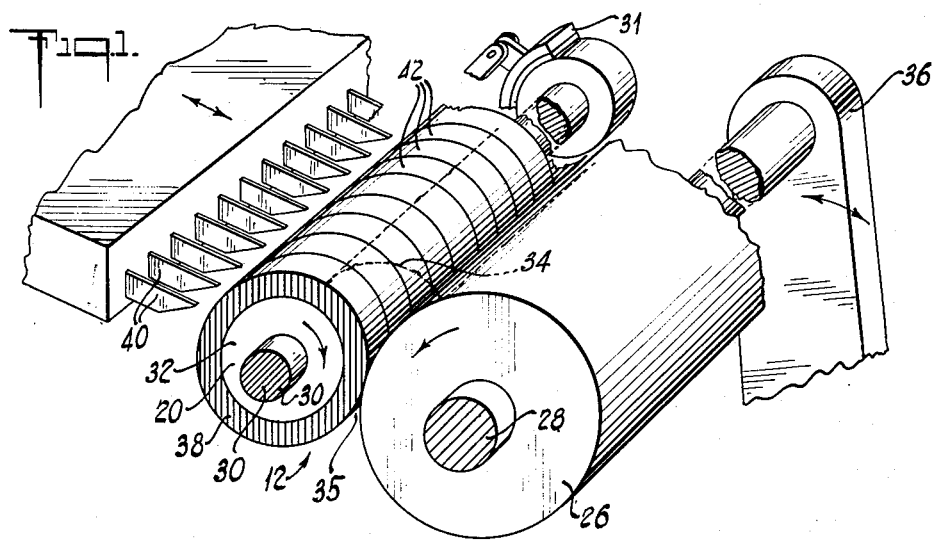
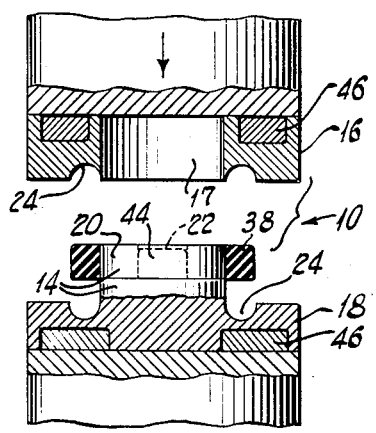
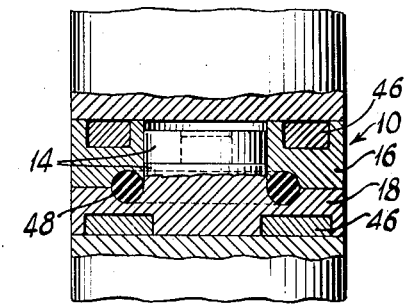
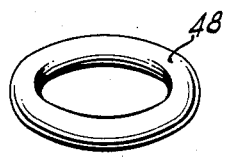
INVENTOR
GEORGE P. LEISTENSNIDER.
BY Virgil C. Kline
ATTORNEY Patented July 28, 1953

2,646,595

UNITED STATES PATENT OFFICE 2,646,595

METHOD FOR MOLDING O-RING GASKETS

George P. Leistensnider, Somerville, N. J., assignor to Johns-Manville Corporation, New York, N. Y., a corporation of New York Application January 28, 1949, Serial No. 73,317

3 Claims. (Cl. 18—55)

The present invention relates to elastic O-rings, and is particularly directed to an improved method of manufacturing elastic O-ring gaskets, packing and the like.

One conventional method of manufacturing elastic packing rings or O-ring gaskets of generally circular cross section, is by extrusion of a moldable plastic rubber compound to form a preform rod of suitable cross section, and thereafter cutting the rod to length and inserting in a mold in which a fused joint is developed between abutting rod ends during heat cure. It has been found that producing O-rings by this method frequently results in a weak joint at which failures occur.

Another conventional method of making O-rings is to die-cut a circular preform ring from a calendered flat sheet of stock, and to then mold and cure said preform to final O-ring shape and dimension. O-rings produced by this latter method have no mold fused joint, but they are defective as to strength because the grain of the stock is not uniform throughout the ring, but on the contrary parallels the walls on two sides and is transverse thereto on the other two sides.

An object of the present invention is to provide a method of forming a jointless O-ring preform having a grain which is continuously parallel to the walls and uniform throughout all portions of the preform.

A further object is to provide an O-ring preform forming method wherein the preform is supported both during formation and during the period of charging into a final O-ring shaping and curing mold.

With the above objects in view, the invention consists in the improved method for molding elastic O-rings which is hereinafter described and more particularly defined by the accompanying claims.

In the following description reference will be made to the attached drawings, in which:

Fig. 1 portrays in perspective an opposed pressure roll and slicing knife assembly for use in forming an O-ring preform in accordance with the present invention;

Fig. 2 shows diagrammatically, in vertical section, the spaced elements of a multi-section O-ring shaping and curing mold including as a part of its core a segment of one of the forming and shaping rolls portrayed in Fig. 1.

Fig. 3 is a vertical section of the shaping and curing mold in closed position; and Fig. 4 is a perspective view of an elastic O-ring.

The principal apparatus elements employed include a multi-sectioned O-ring mold 10, as portrayed in Figs. 2 and 3; and an opposed roll preform forming unit 12, as illustrated in Fig. 1.

Referring particularly to Fig. 2, the sectioned mold unit therein portrayed includes a segmental cylindrical mold core 14 and relatively reciprocable annular male and female mold sections 16 and 18, respectively. The mold core 14 has a removable upper segment 20 in the form of a short cylinder having a central bore 22. The top or male section 16 of the mold has a central bore 17 which is dimensioned for slidable mounting on the mold core 14, including segment 20 thereof. In the particular mold design which is portrayed, each section of the mold includes half of the O-ring molding aperture 24.

Referring to Fig. 1, the opposed roll preform forming unit includes a hard surfaced steel roll 26 which is similar in design and mode of operation to a conventional rubber mill roll, and which is mounted on a driven shaft 28. Placed parallel to shaft 28 and adjustably spaced with respect to shaft 28, is another shaft 30 which is dimensioned to mount one or more of the cylindrical mold core segments 20, to thereby form the other roll 32 of the preform molding unit. The core segments 20 are of hardened metal and have an outside diameter which is the same as the inside diameter of the desired preform ring. The speed of rotation of the shaft 30 and of a cylindrical mold core segment 20 mounted thereon, is adjustable relative to the speed of rotation of driven shaft 28, by reason of braking mechanism 31 mounted on shaft 30 for the purpose of developing a differential surface speed between the surface of roll 32 and the surface of roll 26. The opposed rolls of unit 12 are operated with such close spacing as to support a bank 34 of rubber-like preform forming material above the bite of the rolls throughout the preform forming operation. As in conventional practice with apparatus of this type, the opening or bite 35 between the rolls of the preform forming unit is gradually widened as by means of suitable counterbalanced swing support 36 for shaft 28, in order to permit of original extrusion or calendering of a thin sheet or ribbon of rubber through the roll bite, followed by gradual building up of a cylindrical preform 38 about the periphery of the accumulator roll 32 as the rolls rotate.

It will be understood that the flexible O-ring gaskets or packing elements which are produced by the present method are not limited as to composition. Almost any suitable vulcanizable rubber composition can be used which is moldable and heat curable to a flexible ring of satisfactory wearing properties. For most purposes it is preferred to employ a vulcanizable mix containing as a matrix a rubber-like material selected from the group consisting of natural rubber and synthetic rubbers such as polychloroprene and copolymers of butadiene and acrylonitrile, or mixtures of these materials. Fillers are incorporated with the rubber-like matrix to impart suitable reinforcing and vulcanizing characteristics. Both organic and inorganic fillers are usually employed, including carbon black, short fibered asbestos, organic anti-oxidants, waxes, rosins and other rubber compounding materials.

As an example of a suitable composition for use in the O-ring preform forming, molding and curing process, the following formula expressed in weight percentages has proven satisfactory:

| | Per cent |
|---|---|
| Synthetic rubber | 52.0 |
| Powdered zinc oxide | 2.6 |
| Stearic acid | .6 |
| Phenol-beta-naphthylamine | 1.2 |
| Dibenzyl sebacate | 7.7 |
| Wax plasticizer | .8 |
| Vulcanizing agents including sulfur | 1.7 |
| Cure accelerator | .4 |
| Carbon black | 33.0 |

The mixture of rubber-like binder and organic and inorganic filler materials can be made up into a dough-like mass on a conventional rubber mixing mill to develop a suitable consistency for molding, prior to the time of charging the preform forming unit of the present apparatus.

The preform forming unit 12 is illustrated in the position which it assumes at the end of a preform forming cycle in which a measured mass or bank 34 (outlined in dotted lines) of premixed plastic vulcanizable rubber-like material has been built up on roll 32 into a number of preform rings 38 each having a volume which will fill the apertures 24 of the mold 10. The opposed roll unit 12 is shown in the position of substantially maximum spacing of shafts 28 and 30 to provide a bite between the rolls 26 and 32 wide enough to build up the preform rings 38 to final thickness on the slower moving roll 32, comprising one or more of the mold core segments 20. While building up a jointless preform cylinder of suitable thickness a carriage mounted multiple severing knife cutter 40 is advanced into operative engagement with the preform on the roll 32 for the purpose of circumferentially severing it at joints 42 in line with the spacing joints between abutting segments 20 of the accumulator roll 32, to thereby separate each roll segment 20 and supported preform ring 38 from other preform rings, without disturbing any preform from its supporting mold core segment 20.

Each preform loaded mold core segment 20 forming roll 32 is then removed from its supporting shaft 30, and one of the segments with its retained preform 38 is placed over a centering pin 44 on the base segment of the curing mold core, in the manner portrayed in Fig. 2. As thus positioned the mold core segment 20 assumes its original function as the top segment of the mold core. The mold top 16 is then shifted downwardly into operative engagement with the mold core, and as the mold is closed the mold top forces the preform ring 38 downwardly over the peripheral surface of the core 14, thereby displacing the preform into the mold cavity 24 in the mold base. With complete closure of the mold the preform is shaped to final O-ring dimensions, and thereafter a heat cure is effected, as by means of steam or other heating medium circulating in the heating cavities 46 of the mold.

After molding and curing an O-ring 48, the cured ring is removed from the mold, and the preform stripped segment 20 of the mold core is removed from its mold position and is again mounted on shaft 30 preparatory to service with the preform forming unit for producing another preform ring. Another preform loaded segment 20 is mounted in the mold 10 preparatory to a new mold closing and curing cycle. It will be evident that the mold core segments function to support the O-ring preform 38 while they are being formed and also up to the time that they are charged to the mold apertures 24 during the down cycle of the mold 10.

The invention which has been thus described by detailed example is not limited as to such details and it is to be understood that variations, changes and modifications are contemplated within the scope of the invention as defined by the following claims.

What I claim is:

1. The method of forming an elastic O-ring which comprises, shaping a measured weight of a plastic mixture of vulcanizable rubbery binder and finely divided filler materials by calendering and circumferentially lapping and pressing the mixture about and upon a support to form a jointless annular preform on the support having a grain which is continuously parallel to the walls and uniform throughout, initiating pressure molding of said preform while it is still on said support, and continuously supporting said preform while molding it to final O-ring dimensions and while heat curing the thus molded O-ring.

2. The method of forming an elastic O-ring which comprises, preparing a moldable plastic mass of vulcanizable rubbery binder and finely divided filler materials, calendering and circumferentially lapping a measured weight of said mass upon a support to form thereon a jointless cylindrical preform of suitable dimensions having a grain which is continuously parallel to the walls and uniform throughout, initiating pressure molding of the preform while it is still on said support, and continuously supporting said preform while molding it to final O-ring dimensions, and heat curing the thus molded O-ring.

3. The method of forming an elastic O-ring which comprises, preparing a moldable heat curable plastic mixture of rubber-like binder and finely divided filler materials, calendering and circumferentially lapping a suitable amount of said mixture about and upon a support to form on the support a jointless annular preform of desired dimensions, and retaining said preform on said support while displacing said preform and while initiating pressure molding thereof to O-ring shape and dimensions.

GEORGE P. LEISTENSNIDER.

References Cited in the file of this patent
UNITED STATES PATENTS

| Number | Name | Date |
|---|---|---|
| 1,918,505 | Wallenberg | July 18, 1933 |
| 1,948,344 | Fischer | Feb. 20, 1934 |
| 2,093,909 | Dodge | Sept. 21, 1937 |
| 2,103,860 | Mazzeo | Dec. 28, 1937 |
| 2,130,254 | Visman | Sept. 13, 1938 |
| 2,139,541 | Farnsworth | Dec. 6, 1938 |
| 2,158,044 | Haller | May 9, 1939 |
| 2,202,875 | Sperry | June 4, 1940 |
| 2,445,742 | Hoch | July 20, 1948 |
| 2,450,448 | Sawyer | Oct. 5, 1948 |